US011620583B2

(12) United States Patent
Wang et al.

(10) Patent No.: US 11,620,583 B2
(45) Date of Patent: Apr. 4, 2023

(54) FEDERATED MACHINE LEARNING USING LOCALITY SENSITIVE HASHING

(71) Applicant: International Business Machines Corporation, Armonk, NY (US)

(72) Inventors: Shiqiang Wang, White Plains, NY (US); Georgios Kollias, White Plains, NY (US); Theodoros Salonidis, Wayne, PA (US)

(73) Assignee: International Business Machines Corporation, Armonk, NY (US)

( * ) Notice: Subject to any disclaimer, the term of this patent is extended or adjusted under 35 U.S.C. 154(b) by 325 days.

(21) Appl. No.: 17/014,281

(22) Filed: Sep. 8, 2020

(65) Prior Publication Data

US 2022/0076169 A1 Mar. 10, 2022

(51) Int. Cl.
*G06N 20/20* (2019.01)
*G06N 3/00* (2023.01)
*G06F 18/23* (2023.01)
*G06F 18/2115* (2023.01)
*G06F 18/214* (2023.01)

(52) U.S. Cl.
CPC ......... *G06N 20/20* (2019.01); *G06F 18/2115* (2023.01); *G06F 18/2148* (2023.01); *G06F 18/23* (2023.01)

(58) Field of Classification Search
CPC .... G06N 20/20; G06N 3/098; G06F 18/2115; G06F 18/23
USPC .......................................................... 706/12
See application file for complete search history.

(56) References Cited

U.S. PATENT DOCUMENTS

| 8,732,025 | B2 | 5/2014 | Gokturk |
| 9,148,738 | B1 | 9/2015 | Sharifi |
| 9,721,190 | B2 | 8/2017 | Sudheendra |
| 2019/0227980 | A1 | 7/2019 | McMahan |
| 2019/0332931 | A1 | 10/2019 | Montantes |
| 2019/0340534 | A1* | 11/2019 | McMahan ............... G06N 20/00 |

OTHER PUBLICATIONS

"Patent Cooperation Treaty PCT Notification of Transmittal of the International Search Report and the Written Opinion of the International Searching Authority, or the Declaration", Applicant's file reference EIE201510PCT, International application No. PCT/CN2021/107390, International filing date 20. Jul. 2021, dated Oct. 20, 2021, 9 pages.

(Continued)

*Primary Examiner* — Jeffery A Williams
(74) *Attorney, Agent, or Firm* — Edward P. Li

(57) ABSTRACT

Using locality sensitive hashing in federated machine learning. A server receives from clients locality sensitive hash (LSH) vectors. In one embodiment, the server groups the clients into clusters, based on the LSH vectors; the server selects a subset of the clients, by choosing at least one client from each of the clusters. In another embodiment, the server finds a subset of the clients, by minimize gradient divergence for the subset of the clients. The server receives from selected clients LSH vectors computed based on parameter vectors of updated models, and based on LSH vectors the server determines whether the updated models are sufficiently different from a model being trained; in response to determining that the updated models are sufficiently different from the model, the server requests the selected clients to send the parameter vectors to the server.

20 Claims, 10 Drawing Sheets

(56) References Cited

OTHER PUBLICATIONS

Bonawitz et al., "Towards Federated Learning at Scale: System Design", arXiv:1902.01046v2 [cs.LG] Mar. 22, 2019, 15 pages.
Georgescu et al., "Mean Shift Based Clustering in High Dimensions: A Texture Classification Example", Proceedings of the Ninth IEEE International Conference on Computer Vision, (ICCV 2003), 2-Volume Set, 8 pages.
Konečný et al., "Federated Learning: Strategies for Improving Communication Efficiency ", arXiv:1610.05492v1 [cs. LG], Oct. 18, 2016, 5 pages.
Lecun, et al., "Gradient-Based Learning Applied to Document Recognition", Proceedings of the IEEE, vol. 86, No. 11, Nov. 1998, pp. 2278-2324.
Li, et al., "Practical Federated Gradient Boosting Decision Trees", Association for the Advancement of Artificial Intelligence, 2020, 8 pages.
Mell et al., "The NIST Definition of Cloud Computing", National Institute of Standards and Technology, Special Publication 800-145, Sep. 2011, 7 pages.
Nishio et al., "Client Selection for Federated Learning with Heterogeneous Resources in Mobile Edge", arXiv:1804.08333v2, Oct. 30, 2018, 7 pages.
Salakhutdinov, et al., "Semantic hashing", International Journal of Approximate Reasoning, 50, (2009), pp. 969-978.
Slaney, et al., "Locality-Sensitive Hashing for Finding Nearest Neighbors", Lecture Notes, IEEE Signal processing magazine 25.2 (2008), pp. 128-131.
Spring, Ryan Daniel, "Resource-Efficient Machine Learning via Count-Sketches and Locality-Sensitive Hashing (LSH)", Doctor of Philosophy Thesis, Rice University, Apr. 2020, 166 pages.
Wang et al., "Adaptive Federated Learning in Resource Constrained Edge Computing Systems", IEEE Journal on Selected Areas in Communications, vol. 37, No. 6, Jun. 2019, pp. 1205-1221.

* cited by examiner

FEDERATED MACHINE LEARNING USING LOCALITY SENSITIVE HASHING

BACKGROUND

The present invention relates generally to federated machine learning, and more particularly to using locality sensitive hashing for dynamically selecting clients and efficiently updating a model in federated machine learning.

Federated machine learning allows a large number of clients or devices (e.g., edge and mobile devices) collaboratively train and/or learn a global model. A federated learning system can have hundreds to millions of clients. It is often sufficient to have only a subset of clients involved in a federated machine learning process, because some of the clients may have similar local data for training the global model. Also, because of cost and efficiency of resources, only a subset of clients are selected. The size of deep neural networks (DNNs) in the federal machine learning is usually large, and sending all model parameters is very inefficient.

Previous disclosures use random selection of clients. In the random selection of clients, resources and cost efficiencies of clients are usually not taken into account, and the fact that certain clients have unique data and can provide important information for machine learning is ignored. For example, Bonawitz et al. discloses a method of in "Towards Federated Learning at Scale: System Design (arXiv: 1902.01046v2, 2019)"; in the method, selection of clients is done by simple reservoir sampling.

Previous disclosures also use optimization-based client selection approaches. In the optimization-based client selection approaches, transmission and processing times are usually considered but data characteristics (e.g., difference in data distributions) at clients are ignored. For example, Nishio et al. discloses a method in "Client Selection for Federated Learning with Heterogeneous Resources in Mobile Edge (arXiv: 804.08333v2, 2018)"; in this disclosure, the time required for the distribution and scheduled update and upload steps is estimated, and client selection for these steps are determined based on the estimated time.

Regarding model updates, previous disclosures use model compression or adapting communication intervals. In the previous disclosure, degrees of the compression or the intervals need to be determined beforehand; however, the determined degrees of the compression or the intervals may not capture the latest dynamics of model parameters. For example, Konečný et al. in "Federated Learning: Strategies for Improving Communication Efficiency (arXiv: 1610.05492v1, 2016)" proposes a method of reducing the uplink communication cost. In another instance, Wang et al. in "Adaptive Federated Learning in Resource Constrained Edge Computing Systems (IEEE Journal on Selected Areas In Communications, 2019)" proposes a control algorithm that determines the best tradeoff between local update and global parameter aggregation to minimize the loss function under a given resource budget.

SUMMARY

In a first aspect, a computer-implemented method of using locality sensitive hashing for dynamically selecting clients in federated machine learning is provided. The computer-implemented method includes receiving, by a server in a federated machine learning system, from respective clients in the federated machine learning system, respective locality sensitive hash vectors computed based on respective gradient vectors of a training objective function. The computer-implemented method further includes grouping, by the server, the respective clients into respective clusters, based on the respective locality sensitive hash vectors. The computer-implemented method further includes selecting, by the server, a subset of the respective clients for further participating in the federated machine learning, by choosing at least one client from each of the respective clusters. In the computer-implemented method, using the respective locality sensitive hash vectors in the federated machine learning speeds up transmitting and processing model parameters.

In the first aspect, the computer-implemented method further includes: determining, by the server, whether a new round of client selection is needed; in response to determining that the new round of client selection is needed, requesting, by the server, the respective clients to send respective new locality sensitive hash vectors computed based on respective current gradient vectors of the training objective function; re-grouping, by the server, the respective clients into respective new clusters, based on the respective new locality sensitive hash vectors; selecting, by the server, a new subset of the respective clients for further participating in the federated machine learning, by choosing at least one client from each of the respective new clusters. The computer-implemented method further includes, in response to determining that the new round of client selection is not needed, keeping, by the server, the subset of the respective clients for further participating in the federated machine learning. The server initiates the new round of client selection, in response to at least one of conditions: a large number of selected clients in the subset of the respective clients become unavailable, cost of the subset of the respective clients has changed significantly, the model parameters are updated towards a direction or at a magnitude that is significantly different from a previous training cycle, and a predetermined amount of time or a predetermined number of iterations has passed.

In the first aspect, the computer-implemented method further includes sending to the respective clients, by the server, the model parameters. The computer-implemented method further includes computing, by the respective clients, the respective gradient vectors, using respective local datasets and the model parameters. The computer-implemented method further includes computing, by the respective clients, the respective locality sensitive hash vectors. The computer-implemented method further includes sending to the server, by the respective clients, the respective locality sensitive hash vectors. For computing the respective locality sensitive hash vectors, the computer-implemented method further includes projecting, by the respective clients, the respective gradient vectors into a low dimensional space.

In the first aspect, the respective clients start with sending the respective locality sensitive hash vectors with lower dimensions. In response to determining that higher precision of the respective locality sensitive hash vectors is needed, the server requests the respective clients to send the respective locality sensitive hash vectors with higher dimensions, until the server is satisfied with received information included in the respective locality sensitive hash vectors.

In a second aspect, a computer-implemented method of using locality sensitive hashing for dynamically selecting clients in federated machine learning is provided. The computer-implemented method includes receiving, by a server in a federated machine learning system, from respective clients in the federated machine learning system, respective locality sensitive hash vectors computed based on respective gradient vectors of a training objective function. The computer-implemented method further includes finding, by the server, a subset of the respective clients, by solving an optimization problem to minimize gradient divergence for the subset of the respective clients, where the respective locality sensitive hash vectors are used in solving the optimization problem. The computer-implemented method further includes selecting, by the server, the subset of the respective clients for further participating in the federated machine learning. In the computer-implemented method, using the respective locality sensitive hash vectors in the federated machine learning speeds up transmitting and processing model parameters.

In the second aspect, the computer-implemented method further includes: determining, by the server, whether a new round of client selection is needed; in response to determining that the new round of client selection is needed, requesting, by the server, the respective clients to send respective new locality sensitive hash vectors computed based on respective current gradient vectors of the training objective function; finding, by the server, a new subset of the respective clients, by solving the optimization problem to minimize gradient divergence for the new subset of the respective clients, where the respective new locality sensitive hash vectors are used in solving the optimization problem; and selecting, by the server, the new subset of the respective clients for further participating in the federated machine learning. The computer-implemented method further includes, in response to determining that the new round of client selection is not needed, keeping, by the server, the subset of the respective clients for further participating in the federated machine learning. The server initiates the new round of client selection, in response to at least one of conditions: a large number of selected clients in the subset of the respective clients become unavailable, cost of the subset of the respective clients has changed significantly, the model parameters are updated towards a direction or at a magnitude that is significantly different from a previous training cycle, and a predetermined amount of time or a predetermined number of iterations has passed.

In the second aspect, the computer-implemented method further includes sending to the respective clients, by the server, the model parameters. The computer-implemented method further includes computing, by the respective clients, the respective gradient vectors, using respective local datasets and the model parameters. The computer-implemented method further includes computing, by the respective clients, the respective locality sensitive hash vectors. The computer-implemented method further includes sending to the server, by the respective clients, the respective locality sensitive hash vectors. For computing the respective locality sensitive hash vectors, the computer-implemented method further includes projecting, by the respective clients, the respective gradient vectors into a low dimensional space.

In the second aspect, the respective clients start with sending the respective locality sensitive hash vectors with lower dimensions. In response to determining that higher precision of the respective locality sensitive hash vectors is needed, the server requests the respective clients to send the respective locality sensitive hash vectors with higher dimensions, until the server is satisfied with received information included in the respective locality sensitive hash vectors.

In a third aspect, a computer-implemented method of using locality sensitive hashing for efficiently updating a model in federated machine learning is provided. The computer-implemented method includes receiving, by a server in a federated machine learning system, from respective selected clients in the federated machine learning system, respective locality sensitive hash vectors computed based on respective parameter vectors of respective updated models. The computer-implemented method further includes determining, by the server, whether the respective updated models of the respective selected clients are sufficiently different from a model that is sent from the server to the respective selected clients for training, based on distances between a locality sensitive hash vector of the model and the respective locality sensitive hash vectors. The computer-implemented method further includes, in response to determining that the respective updated models are sufficiently different from the model, requesting, by the server, the respective selected clients to send the respective parameter vectors to the server. In the computer-implemented method, using the respective locality sensitive hash vectors in the federated machine learning speeds up transmitting and processing model parameters.

In the third aspect, the computer-implemented method further includes, in response to determining that the respective updated models are not sufficiently different from the model, requesting, by the server, the respective selected clients to continue to train the model and to send to the server the respective locality sensitive hash vectors.

In the third aspect, the computer-implemented method further includes computing, by the respective selected clients, the respective locality sensitive hash vectors. The computer-implemented method further includes sending to the server, by the respective selected clients, the respective locality sensitive hash vectors. For computing the respective locality sensitive hash vectors, the computer-implemented method further includes projecting, by the respective selected clients, the respective parameter vectors of the respective updated models into a low dimensional space.

In the third aspect, for determining the respective selected clients, the computer-implemented method further includes: receiving, by the server, from respective clients in the federated machine learning system, the respective locality sensitive hash vectors; grouping, by the server, the respective clients into respective clusters, based on the respective locality sensitive hash vectors; and determining, by the server, the respective selected clients for participating in the federated machine learning, by choosing at least one client from each of the respective clusters.

In the third aspect, for determining the respective selected clients, the computer-implemented method further: receiving, by the server, from respective clients in the federated machine learning system, the respective locality sensitive hash vectors; finding, by the server, a subset of the respective clients, by solving an optimization problem to minimize gradient divergence for the subset of the respective clients; and determining, by the server, the subset of the respective clients as the respective selected clients for participating in the federated machine learning.

DETAILED DESCRIPTION

Figure 1:
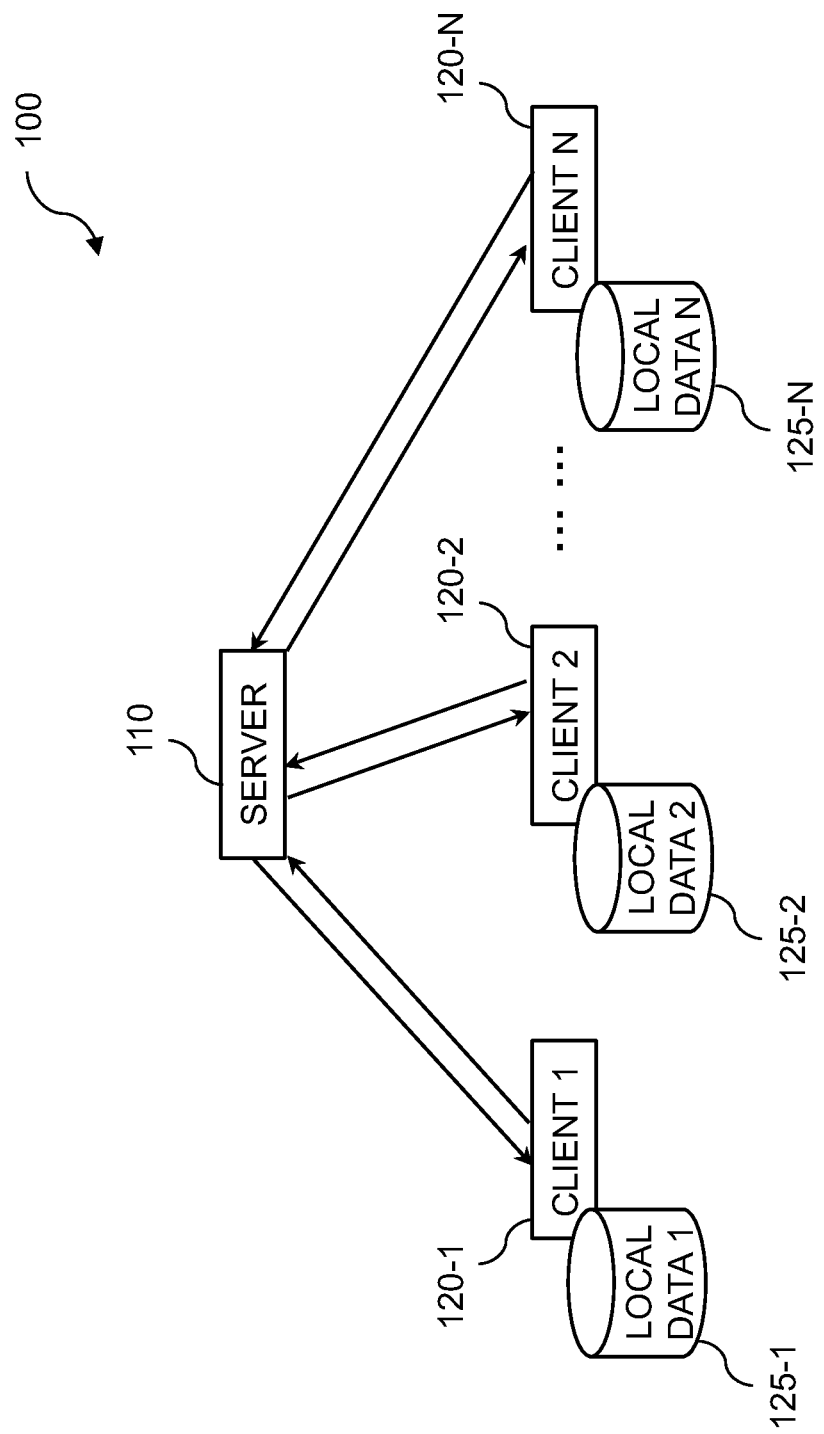
FIG. 1 is a systematic diagram illustrating a system of federated machine learning, in accordance with one embodiment of the present invention.

FIG. 1 is a systematic diagram illustrating federated machine learning system 100, in accordance with one embodiment of the present invention. Federated machine learning system 100 includes server 110. Federated machine learning system 100 further includes N clients, namely client 1 120-1, client 2 120-2, . . . , and client N 120-N. For example, the clients may be edge and mobile devices. Each client has its own local dataset: client 1 120-1 has local data 1 125-1, client 2 120-2 has local data 2 125-2, . . . , and client N 120-N has local data N 125-N.

In one embodiment, server 110 may reside on a computing device. In another embodiment, server 110 may reside on a virtual machine or another virtualization implementation. The virtual machine or the virtualization implementation runs on a computing device. The computing device is described in more detail in later paragraphs with reference to FIG. 7.

Each of client 1 (120-1), client 2 (120-2), . . . , and client N (120-N) may reside on a computing device. The computing device may be any electronic device or computing system capable of receiving input from a user, executing computer program instructions, and communicating with another computing system via a network. The computing device is described in more detail in later paragraphs with reference to FIG. 7.

In one embodiment, local data 1 125-1, local data 2 125-2, . . . , and local data N 125-N are hosted by client 1 (120-1), client 2 (120-2), . . . , and client N (120-N), respectively. In another embodiment, local data 1 125-1, local data 2 125-2, . . . , and local data N 125-N are stored in storage devices and local datasets are loaded to client 1 (120-1), client 2 (120-2), . . . , and client N (120-N) during a federated machine learning process.

Federated machine learning system 100 may be implemented in a network that can be any combination of connections and protocols which support communications between server 110 and each of client 1 120-1, client 2 120-2, . . . , and client N (120-N). For example, the network may be the Internet which represents a worldwide collection of networks and gateways to support communications between devices connected to the Internet; the network may be implemented as an intranet, a local area network (LAN), a wide area network (WAN), or a wireless network. Federated machine learning system 100 may be implemented in a cloud computing environment. The cloud computing environment is described in later paragraphs with reference to FIG. 8 and FIG. 9.

A standard federal machine learning process includes: (1) Server 110 sends model parameters (or a model parameter vector) to client 1 120-1, client 2 120-2, . . . , and client N (120-N). (2) Each of client 1 120-1, client 2 120-2, . . . , and client N (120-N) computes its updated model parameters using stochastic gradient descent and then sends either a model parameter vector or the change (delta) of model parameter vector to server 110. (3) Server 110 aggregates model parameter vectors or changes (deltas) model parameter vectors received from client 1 120-1, client 2 120-2, . . . , and client N (120-N) and then updates the model parameters on server 110. (4) Federated machine learning system 100 repeats (1)-(4) until convergence.

Embodiments of the present invention disclose a method of using locality sensitive hashing for dynamically selecting clients and determining an optimal subset of clients. Embodiments of the present invention disclose a method of using locality sensitive hashing for efficiently updating models and determining whether full parameter vectors should be transmitted from clients to a server.

Figure 2:
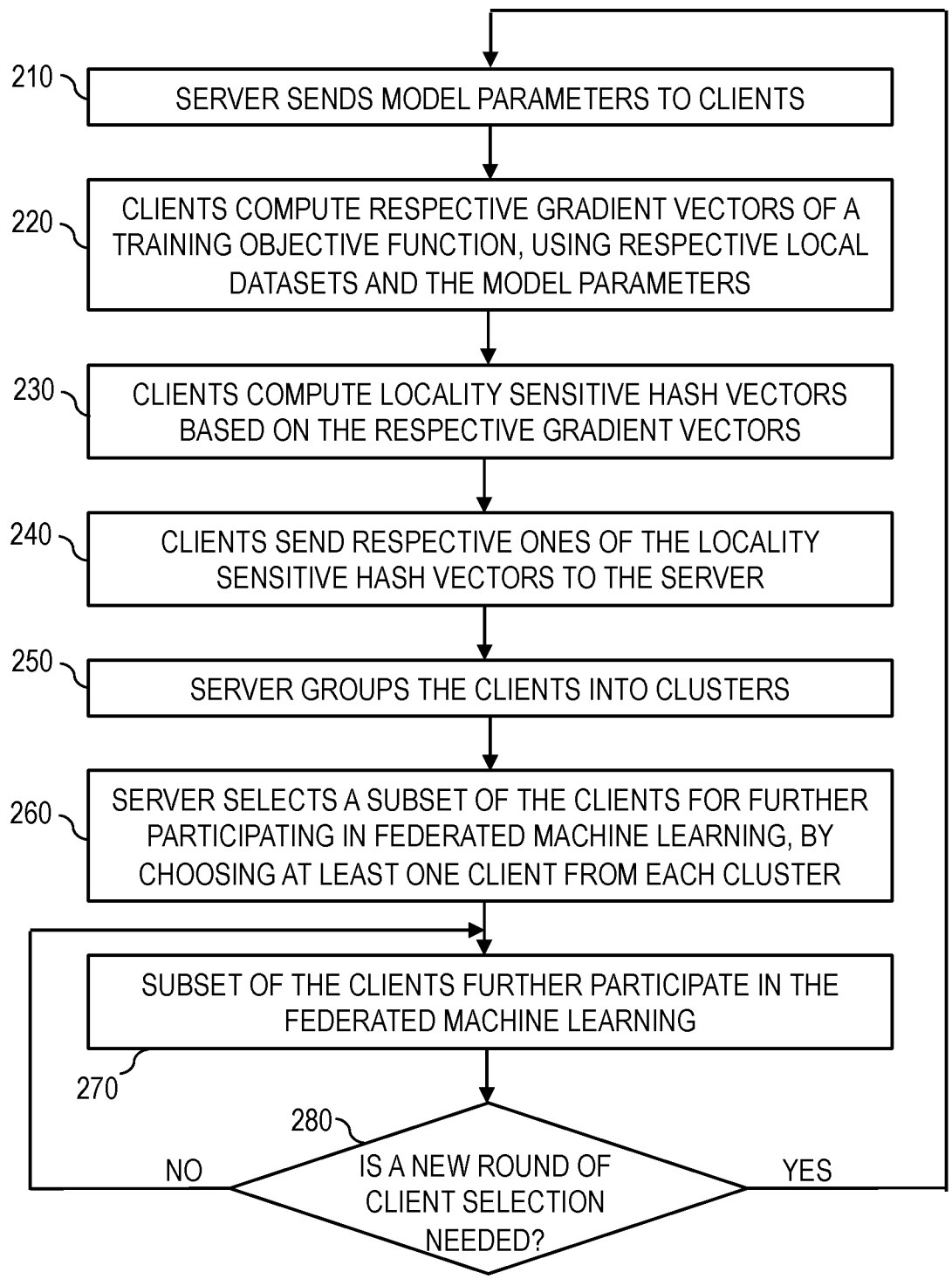
FIG. 2 presents a flowchart showing operational steps of using locality sensitive hashing for dynamically selecting clients, in accordance with one embodiment of the present invention.

FIG. 2 presents a flowchart showing operational steps of using locality sensitive hashing for dynamically selecting clients, in accordance with one embodiment of the present invention. In this embodiment shown in FIG. 2, dynamically selecting clients is performed by clustering clients based on locality sensitive hash vectors.

At step 210, a server in a federated machine learning system sends model parameters to clients in the federated machine learning system, at the beginning of a federated machine learning process. For example, shown in FIG. 1, server 110 in federated machine learning system 100 sends model parameters to client 1 120-1, client 2 120-2, . . . , and client N 120-N.

At step 220, the clients computes respective gradient vectors of a training objective function, using respective local datasets and the model parameters received from the server at step 210. Each of the clients calculates its own gradient vector of the training objective function, and each of the clients use its own local dataset. For example, each of client 1 120-1, client 2 120-2, . . . , and client N 120-N calculates its own gradient vector, using local data 1 125-1, local data 2 125-2, . . . , and local data N 125-N, respectively.

At step 230, the clients computes locality sensitive hash (LSH) vectors based on the respective gradient vectors. For example, each of client 1 120-1, client 2 120-2, . . . , and client N 120-N calculates its own locality sensitive hash (LSH) vector based on its own gradient vector. Each of the clients projects the gradient vector into a low dimensional space, where the low dimensional space may be spanned by the principal components of historical gradient updates (e.g., obtained by principle component analysis (PCA) using a random matrix).

The dimension (size) of an LSH vector may vary over time, based on the server's determination (estimation) about how different the gradients of the clients are. The dimension (size) of an LSH vector may be also related to the total number of clients. The clients may start with sending lower dimensional LSH vectors first. If the server determines that a higher precision is needed (e.g., there are too many collisions or nearby hash vectors), the server may request the clients to send higher dimensional LSH vectors. The server may further request the clients to further increase the dimension of the LSH vectors, until the server is satisfied with received information included in the LSH vectors.

At step 240, the clients send respective ones of the locality sensitive hash (LSH) vectors to the server. For example, each of client 1 120-1, client 2 120-2, . . . , and client N 120-N sends its own locality sensitive hash (LSH) vector to server 110. The locality sensitive hash (LSH) vectors are leveraged for efficient communication between the server and each of the clients. Using the respective locality sensitive hash vectors in the federated machine learning speeds up transmitting and processing model parameters. From each of the clients to the server a hash of gradient vector, model parameter vector, or difference of model parameter vector, so that similar vectors are either in the same bucket with same hash code or are close to each other in the distance space.

Upon receiving the locality sensitive hash (LSH) vectors from the clients, at step 250, the server groups the clients into clusters, based on the respective ones of the locality sensitive hash (LSH) vectors. For example, server 110 receives the respective ones of the locality sensitive hash (LSH) vectors provided by client 1 120-1, client 2 120-2, . . . , and client N 120-N; based on the LSH vectors, server 110 groups client 1 120-1, client 2 120-2, . . . , and client N 120-N into clusters. In some embodiments, for example, the server groups the clients into clusters, based on similarities among clients; the similarities are computed using the respective ones of the locality sensitive hash (LSH) vectors provided by the clients. In some other embodiments, for example, the server uses K-means to group the respective ones of the locality sensitive hash (LSH) vectors of the clients.

At step 260, the server selects a subset of the clients for further participating in federated machine learning, by choosing at least one client from each of the clusters. Other clients that are not selected into the subset will not participate in next rounds of federated machine learning, until they are re-selected. For example, server 110 selects a subset of client 1 120-1, client 2 120-2, . . . , and client N 120-N for further participating in federated machine learning. Choosing at least one client from each cluster may be done in a random, round robin, or resource-based manner. At step 270, the subset of the clients (which are selected at step 260) further participate in the federated machine learning.

In selecting the subset of the clients, the server may calculate distances between LSH vectors to determine whether clients in a specific cluster are significantly different from other clients in other clusters. If the goal of model training is to fit data of the other clients in the other clusters, no client in the specific cluster is selected.

At step 280, the server determines whether a new round of client selection is needed. The frequency of performing an LSH-based client selection procedure is chosen by the server; the server monitors the status of the federated machine learning system and a trend of model parameter updates. For example, the new round of client selection may be initiated under at least one of the following conditions: (1) A large number of previously selected clients become unavailable. (2) The cost of selected clients has changed significantly. (3) The model parameters are updated towards a direction or at a magnitude that is significantly different from a previous training cycle. (4) A predetermined amount of time or a predetermined number of iterations has passed.

In response to determining that the new round of client selection is needed (YES branch of block 280), the federated machine learning system reiterates steps 210-280. The server requests the clients to send new locality sensitive hash vectors calculated based on current gradient vectors of the training objective function. The server re-groups the clients into new clusters, based on the respective ones of the new locality sensitive hash (LSH) vectors. The server selects a new subset of the clients by choosing at least one client from each of the new clusters.

In response to determining that the new round of client selection is not needed (NO branch of block 280), the federated machine learning system reiterates steps 270-280. The server keeps the subset of the clients for further participating in the federated machine learning. The subset of the clients continues to participate in the federated machine learning, until server at step 280 determines that the new round of client selection is needed.

Figure 3:
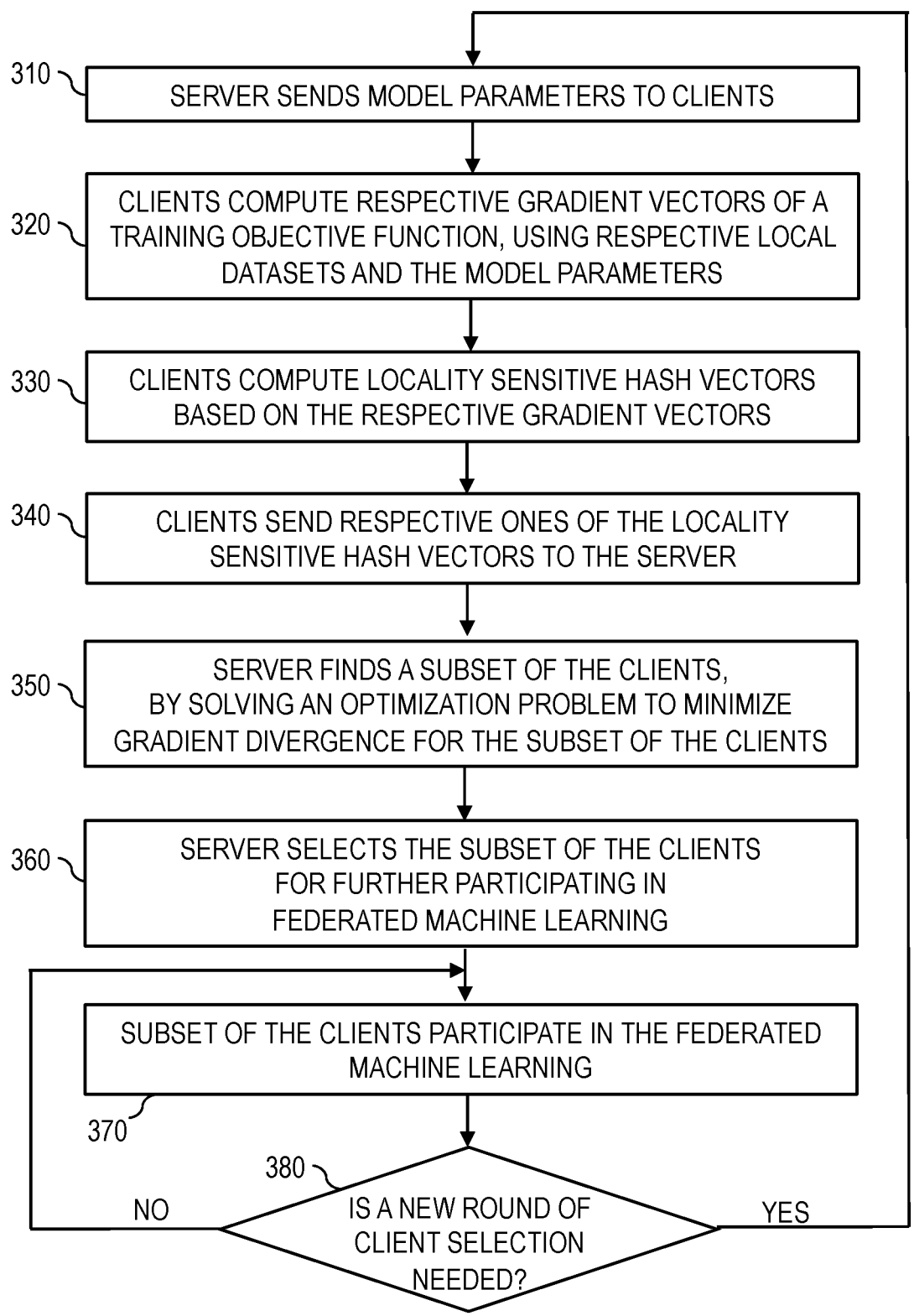
FIG. 3 presents a flowchart showing operational steps of using locality sensitive hashing for dynamically selecting clients, in accordance with another embodiment of the present invention.

FIG. 3 presents a flowchart showing operational steps of using locality sensitive hashing for dynamically selecting clients, in accordance with another embodiment of the present invention. In this embodiment shown in FIG. 3, dynamically selecting clients is performed by using an optimization procedure that minimizes the gradient divergence subject to a cost and resource constraint.

Steps 310-340 in FIG. 3 are similar to steps 210-240 in FIG. 2. For the sake of brevity, steps 310-340 are listed below. For detailed discussion, previous paragraphs related to steps 210-240 may be referenced. At step 310, a server in a federated machine learning system sends model parameters to clients in the federated machine learning system, at the beginning of a federated machine learning process. At step 320, clients computes respective gradient vectors of a training objective function, using respective local datasets and the model parameters received from the server at step 310. At step 330, the clients computes locality sensitive hash (LSHs) vectors based on the respective gradient vectors. At step 340, the clients send respective ones of the locality sensitive hash (LSH) vectors to the server.

Upon receiving the locality sensitive hash (LSH) vectors from the clients, at step 350, the server finds a subset of the clients, by solving an optimization problem to minimize gradient divergence for the subset of the clients. The optimization problem can be as follows:

$$\min_{x_i} \max_i x_i \left\| g_i - \frac{\sum_{i=1}^{N} x_i g_i}{N} \right\|^2, \text{ s.t. } x_i \in \{0, 1\}, \sum_{i=1}^{N} x_i \leq C$$

where $g_i$ is the locality sensitive hash (LSH) vector of the gradient vector for client i, and C is the maximum number of selected clients or the subset of the clients. In solving the optimization problem, the locality sensitive hash (LSH) vectors are used. At step 360, the server selects the subset of the clients (found at step 350) for further participating in federated machine learning.

Steps 370-380 in FIG. 3 are similar to steps 270-280 in FIG. 2. For the sake of brevity, steps 370-380 are listed below. For detailed discussion, previous paragraphs related to steps 270-280 may be referenced. At step 370, the subset of the clients (which are selected at step 360) further participate in the federated machine learning. At step 380, the server determines whether a new round of client selection is needed.

In response to determining that the new round of client selection is needed (YES branch of block 380), the federated machine learning system reiterates steps 310-380. The server requests the clients to send new locality sensitive hash vectors computed based on current gradient vectors of the training objective function. The server finds a new subset of the clients, by solving the optimization problem to minimize gradient divergence for the new subset of the clients. In solving the optimization problem, the new locality sensitive hash vectors are used. The server selects the new subset of the clients for further participating in the federated machine learning.

In response to determining that the new round of client selection is not needed (NO branch of block 380), the federated machine learning system reiterates steps 370-380. The server keeps the subset of the clients for further participating in the federated machine learning. The current subset of the clients continues to participate in the federated machine learning, until server at step 380 determines that the new round of client selection is needed.

Figure 4:
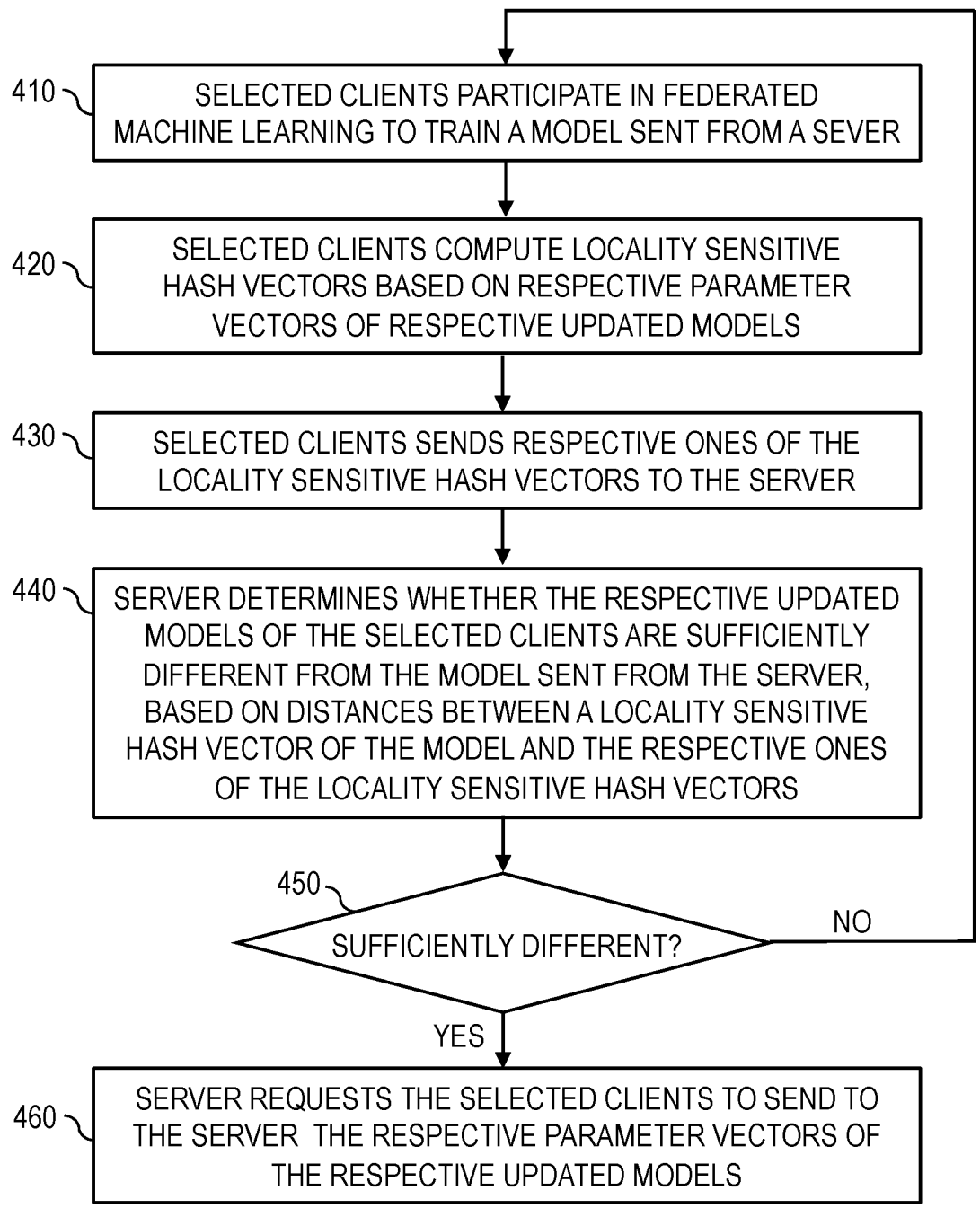
FIG. 4 presents a flowchart showing operational steps of using locality sensitive hashing for efficiently updating a model, in accordance with one embodiment of the present invention.

FIG. 4 presents a flowchart showing operational steps of using locality sensitive hashing for efficiently updating a model, in accordance with one embodiment of the present invention. At step 410, selected clients participates in federated machine learning to train a model sent from a server. The model is sent from the server to the selected clients for training. The selected clients are the subset of clients which are dynamically selected in a procedure shown in FIG. 2 or FIG. 3. The model has been obtained by the server by aggregating models sent from the selected clients in a previous round of model training.

At step 420, the selected clients compute locality sensitive hash (LSH) vectors based on respective model parameter vectors of respective updated models (which are updated by the selected clients). The locality sensitive hash (LSH) vectors are obtained from model parameter vectors or changes in model parameter vectors of the respective updated models. Each of the selected clients calculates its own locality sensitive hash (LSH) vector of its own updated model. For calculating its own its own locality sensitive hash (LSH) vector, each of the elected clients projects its own model parameter vector into a low dimensional space.

At step 430, the selected clients send respective ones of the locality sensitive hash (LSH) vectors to the server. Each of the selected clients sends its own locality sensitive hash (LSH) vector to the server. The locality sensitive hash (LSH) vectors are leveraged for efficient communication between the server and each of the clients.

Upon receiving the locality sensitive hash (LSH) vectors from the selected clients, at step 440, the server determines whether the respective updated models of the selected clients are sufficiently different from the model, based on distances between a locality sensitive hash vector of the model and the respective ones of the locality sensitive hash vectors. To determine whether the respective updated models are sufficiently different, the server calculates distances between an LSH vector of the model and the respective ones of the LSH vectors. If the distances are greater than a predetermined threshold, the respective updated models of the selected clients are sufficiently different from the model; otherwise, the respective updated models of the selected clients are not sufficiently different from the model.

In response to determining that the respective updated models of the selected clients are sufficiently different from the model (YES branch of block 450), at step 460, the server requests the selected clients to send to the server the respective parameter vectors of the respective updated models. The respective parameter vectors are full parameter vectors capturing the respective updated models. In response to determining that the respective updated models of the selected clients are not sufficiently different from the model (NO branch of block 450), the federated machine learning system reiterates steps 410-450 and the server requests the selected clients to continues to train the model and to send to the server the respective locality sensitive hash vectors, until the respective updated models of the selected clients become sufficiently different from the model.

To illustrate the benefit of LSH-based client selection disclosed in the present invention, experiments were conducted using the MNIST (Modified National Institute of Standards and Technology) dataset. In the experiments, the MNIST dataset contained hand-written digits with 10 different labels. In the experiments, a 3-layer neural network model with 300 neurons in the hidden layer was used.

In the experiment of the LSH-based client selection, a federated learning system was with 50 clients and with non-IID data distributions. Each client only had data containing one label, so that, for each label, the corresponding data samples were randomly partitioned into 5 different clients and different clients' data samples did not overlap.

In the experiment of the LSH-based client selection, client selection was done at the start of federated learning and then every 100 iterations. The experiments used K-means to group the LSH vectors of the gradients (which were computed by the clients) into 10 clusters, and then one client was randomly selected from each cluster. The LSH algorithm uses a random matrix to project the original vector onto a low-dimensional space.

Figure 5:
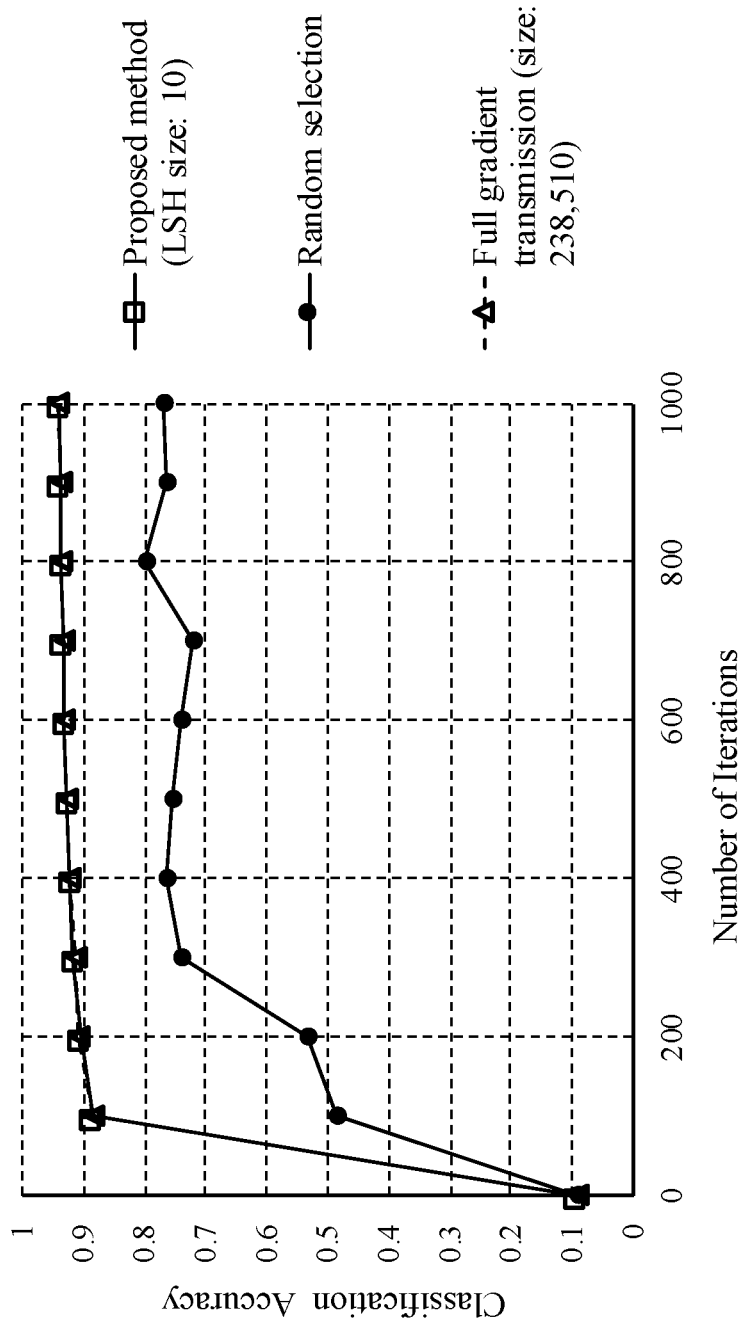
FIG. 5 presents experimental results of using locality sensitive hashing for dynamically selecting clients, in accordance with one embodiment of the present invention.

FIG. 5 presents experimental results of using locality sensitive hashing for dynamically selecting clients, in accordance with one embodiment of the present invention. FIG. 5 presents results of three experiments as follows: first experiment—using locality sensitive hashing for dynamically selecting clients (proposed in the present invention); second experiment—random client selection (prior art); and third experiment—client selection based on full transmission of gradients from clients to a server (full transmission of gradients without using locality sensitive hashing).

Both the first experiment (using locality sensitive hashing proposed in the present invention) and the third experiment (without using locality sensitive hashing) achieved a convergence accuracy of 94% at iteration 1000. However, the second experiment (random client selection) only achieved an accuracy of 77% with the same number of iterations.

In the first experiment (using locality sensitive hashing proposed in the present invention), only a 10-dimensional LSH vectors needed to be transmitted from each client to a server. However, in the third experiment (full transmission of gradients without using locality sensitive hashing), a 238,510-dimensional vector needed to be transmitted from each client to a server. The method proposed in the present invention achieved the same convergence and classification accuracy as the method with full transmission of gradients, while the method proposed in the present invention only transmitted $10/238510 \approx 0.004\%$ of the original gradient vector. It was concluded that the method proposed in the present invention significantly reduced communication overhead.

In experiments of the LSH-based model updating, an LSH vector of size 100 was used to encode an updated parameter vector of each selected clients, and aggregation of full parameter vectors of all selected clients was only performed when the relative change of parameter (computed based on LSH vectors received at the server) exceeded a predetermined threshold. The predetermined threshold was empirically set as: 2.5% for the first 1000 iterations and 0.5% for the remaining iterations.

Figure 6A:
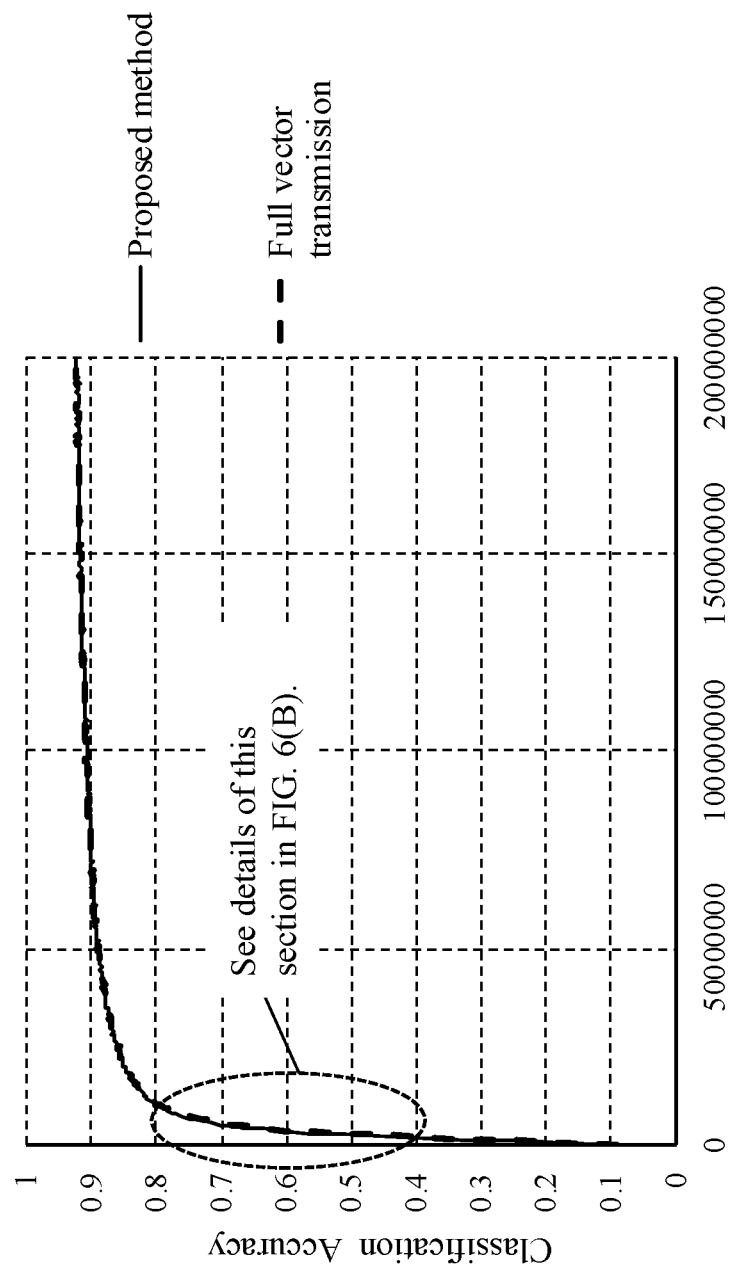
FIG. 6(A) and FIG. 6(B) present experimental results of using locality sensitive hashing for efficiently updating models, in accordance with one embodiment of the present invention.
Figure 6B:
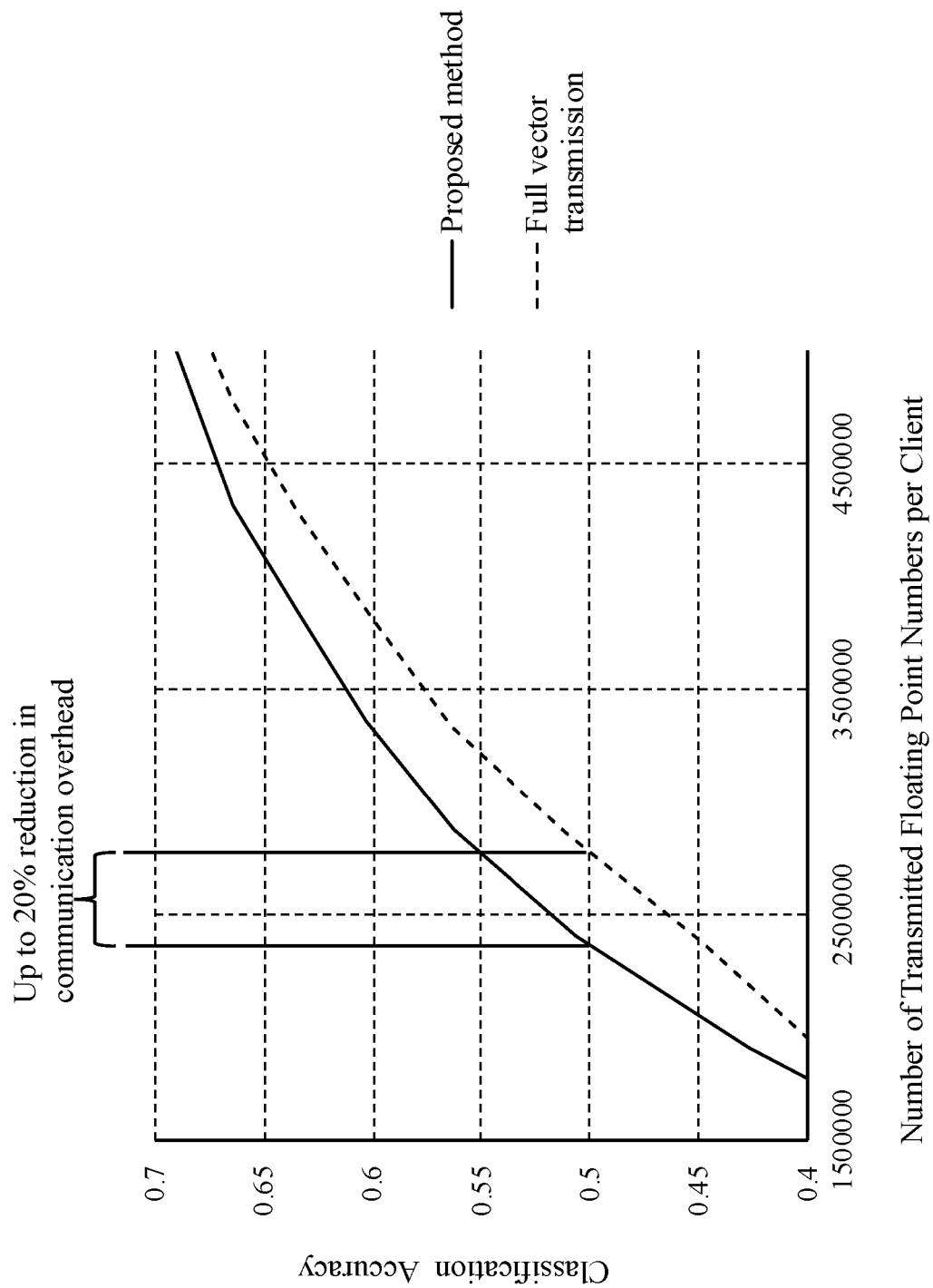

FIG. 6(A) and FIG. 6(B) present experimental results of using locality sensitive hashing for efficiently updating models, in accordance with one embodiment of the present invention. FIG. 6(A) and FIG. 6(B) present experimental results for two experiments: (1) the proposed method in the present invention and (2) the method with full transmission of gradients. FIG. 6(A) shows classification accuracy versus the number of transmitted floating point numbers per client from 0 to 200,000,000. FIG. 6(B) shows classification accuracy versus the number of transmitted floating point numbers per client from 0 to 4,500,000. FIG. 6(A) and FIG. 6(B) indicates that the method proposed in the present invention further saved communication overhead during iterative model update, up to 20% especially at initial training stages, compared to the method with full transmission of gradients. FIG. 6(A) and FIG. 6(B) further indicates that the method proposed in the present invention converged to the same accuracy as the method with transmitting the full parameter vectors.

Figure 7:
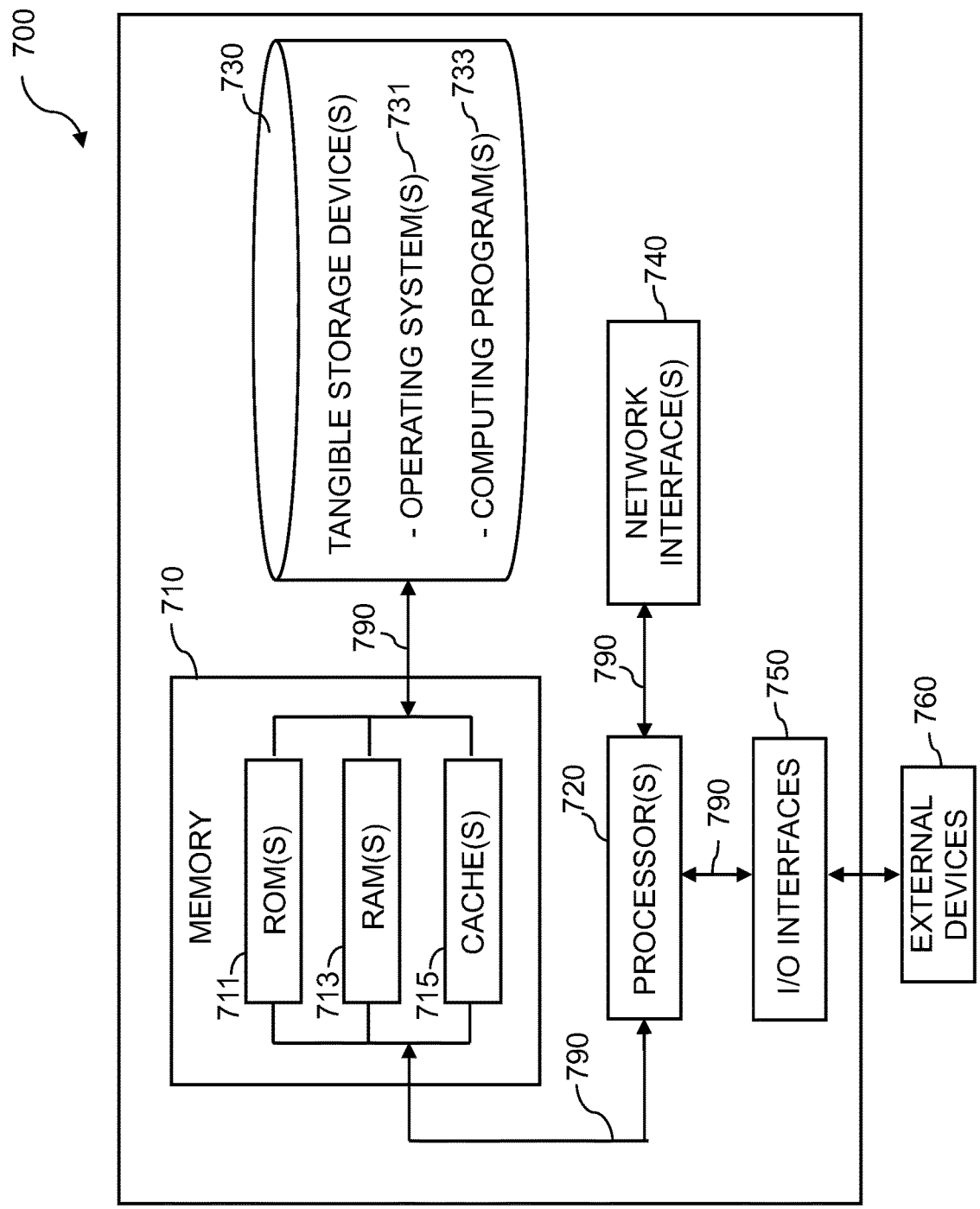
FIG. 7 is a diagram illustrating components of a computing device or server, in accordance with one embodiment of the present invention.

FIG. 7 is a diagram illustrating components of computing device or server 700, in accordance with one embodiment of the present invention. It should be appreciated that FIG. 7 provides only an illustration of one implementation and does not imply any limitations with regard to the environment in which different embodiments may be implemented.

Referring to FIG. 7, computing device or server 700 includes processor(s) 720, memory 710, and tangible storage device(s) 730. In FIG. 7, communications among the above-mentioned components of computing device or server 700 are denoted by numeral 790. Memory 710 includes ROM(s) (Read Only Memory) 711, RAM(s) (Random Access Memory) 713, and cache(s) 715. One or more operating systems 731 and one or more computer programs 733 reside on one or more computer readable tangible storage device(s) 730.

Computing device or server 700 further includes I/O interface(s) 750. I/O interface(s) 750 allows for input and output of data with external device(s) 760 that may be connected to computing device or server 700. Computing device or server 700 further includes network interface(s) 740 for communications between computing device or server 700 and a computer network.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the C programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
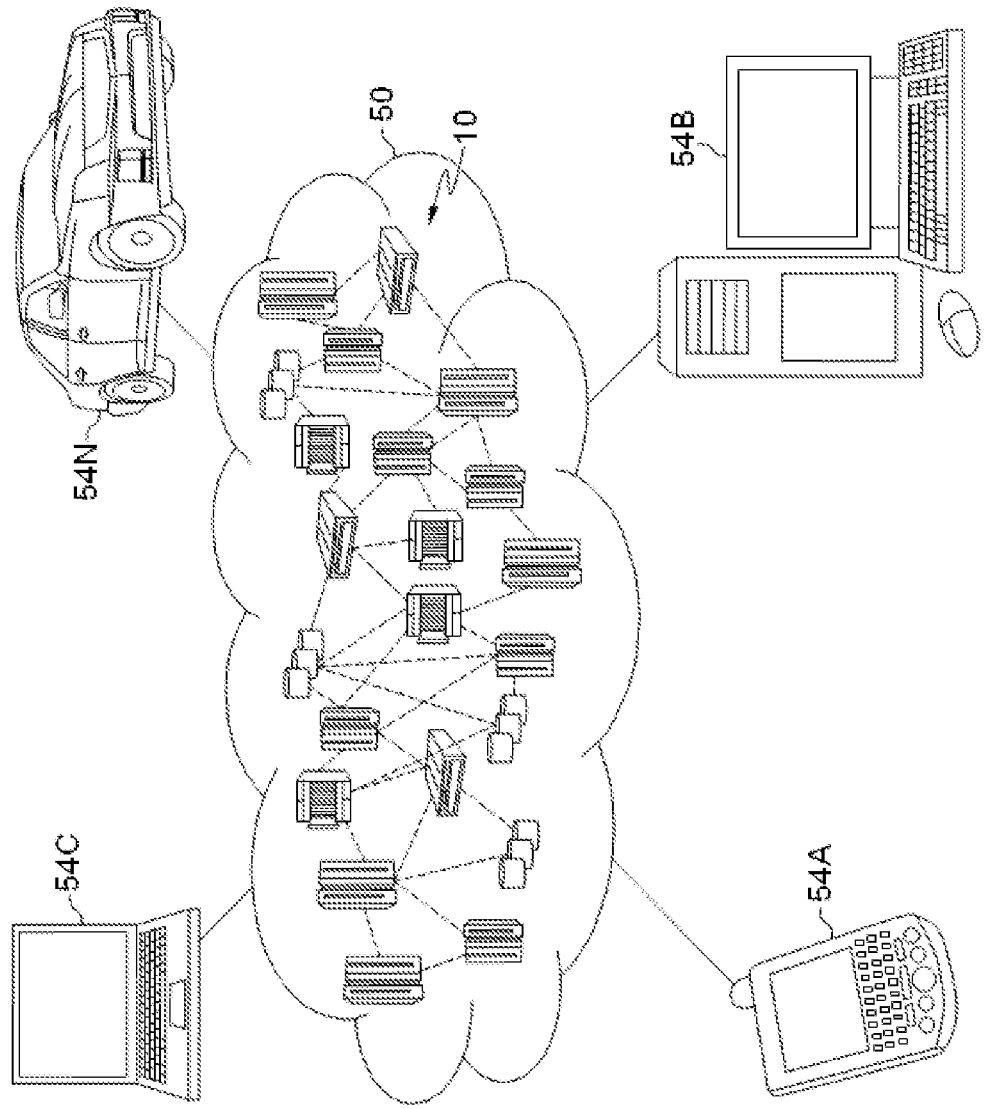
FIG. 8 depicts a cloud computing environment, in accordance with one embodiment of the present invention.

Referring now to FIG. 8, illustrative cloud computing environment 50 is depicted. As shown, cloud computing environment 50 includes one or more cloud computing nodes 10 with which local computing devices are used by cloud consumers, such as mobile device 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N are intended to be illustrative only and that computing nodes 10 and cloud computing environment 50 can communicate with any type of computerized device over any type of network and/or network addressable connection (e.g., using a web browser).

Figure 9:
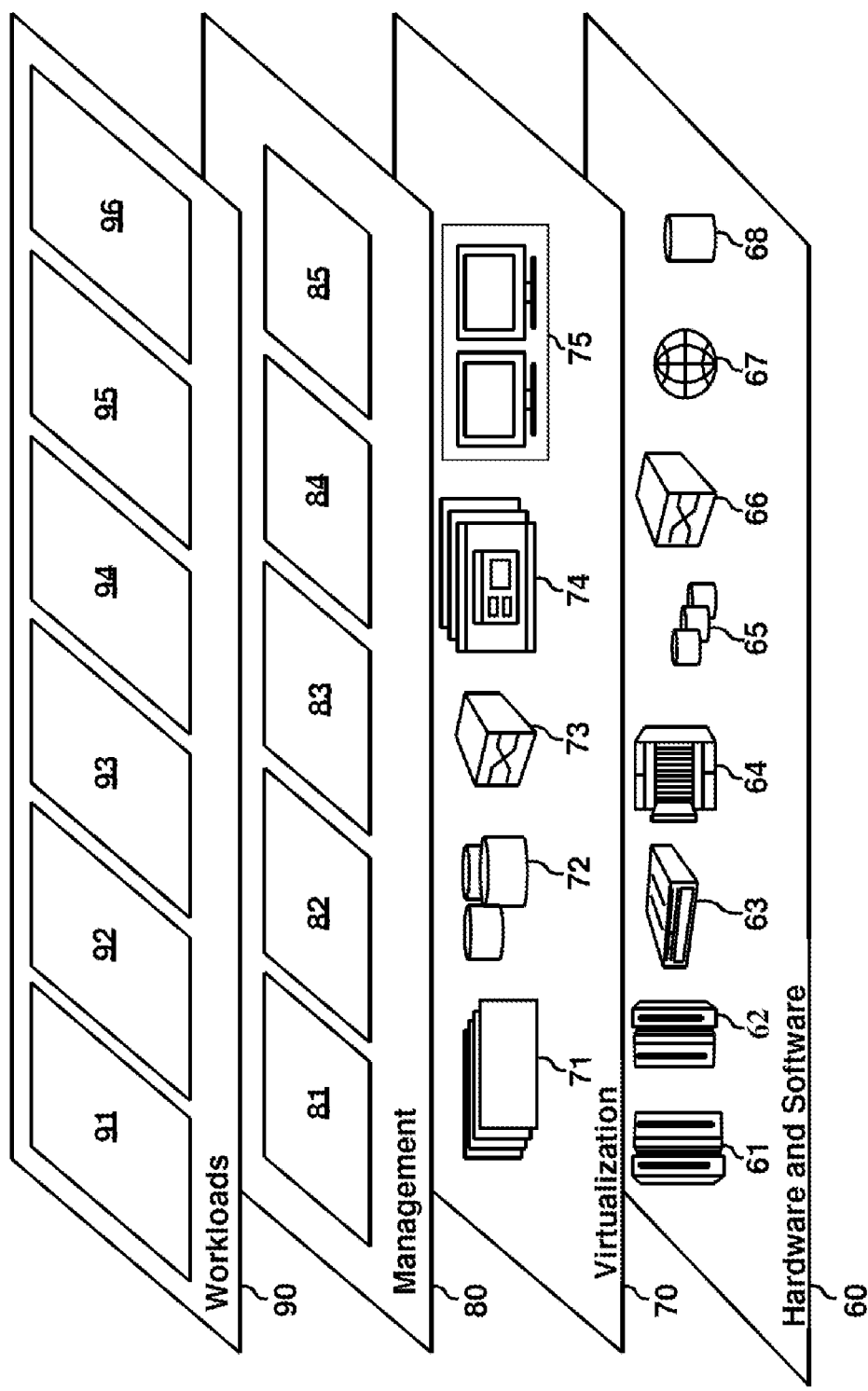
FIG. 9 depicts abstraction model layers in a cloud computing environment, in accordance with one embodiment of the present invention.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and function 96. Function 96 in the present invention is the functionality of using locality sensitive hashing for dynamically selecting clients and efficiently updating a model in federated machine learning.

What is claimed is:

1. A computer-implemented method of using locality sensitive hashing for dynamically selecting clients in federated machine learning, the method comprising:
   receiving, by a server in a federated machine learning system, from respective clients in the federated machine learning system, respective locality sensitive hash vectors computed based on respective gradient vectors of a training objective function;
   grouping, by the server, the respective clients into respective clusters, based on the respective locality sensitive hash vectors;
   selecting, by the server, a subset of the respective clients for further participating in the federated machine learning, by choosing at least one client from each of the respective clusters; and
   wherein using the respective locality sensitive hash vectors in the federated machine learning speeds up transmitting and processing model parameters.

2. The computer-implemented method of claim 1, further comprising:
   determining, by the server, whether a new round of client selection is needed;
   in response to determining that the new round of client selection is needed, requesting, by the server, the respective clients to send respective new locality sensitive hash vectors computed based on respective current gradient vectors of the training objective function;
   re-grouping, by the server, the respective clients into respective new clusters, based on the respective new locality sensitive hash vectors; and
   selecting, by the server, a new subset of the respective clients for further participating in the federated machine learning, by choosing at least one client from each of the respective new clusters.

3. The computer-implemented method of claim 2, further comprising:
   in response to determining that the new round of client selection is not needed, keeping, by the server, the subset of the respective clients for further participating in the federated machine learning.

4. The computer-implemented method of claim 2, wherein the server initiates the new round of client selection, in response to at least one of conditions: a large number of selected clients in the subset of the respective clients become unavailable, cost of the subset of the respective clients has changed significantly, the model parameters are updated towards a direction or at a magnitude that is significantly different from a previous training cycle, and a predetermined amount of time or a predetermined number of iterations has passed.

5. The computer-implemented method of claim 1, further comprising:
   sending to the respective clients, by the server, the model parameters;
   computing, by the respective clients, the respective gradient vectors, using respective local datasets and the model parameters;
   computing, by the respective clients, the respective locality sensitive hash vectors; and sending to the server, by the respective clients, the respective locality sensitive hash vectors.

6. The computer-implemented method of claim 5, further comprises:
for computing the respective locality sensitive hash vectors, projecting, by the respective clients, the respective gradient vectors into a low dimensional space.

7. The computer-implemented method of claim 6, wherein the respective clients start with sending the respective locality sensitive hash vectors with lower dimensions; wherein, in response to determining that higher precision of the respective locality sensitive hash vectors is needed, the server requests the respective clients to send the respective locality sensitive hash vectors with higher dimensions, until the server is satisfied with received information included in the respective locality sensitive hash vectors.

8. A computer-implemented method of using locality sensitive hashing for dynamically selecting clients in federated machine learning, the method comprising:
receiving, by a server in a federated machine learning system, from respective clients in the federated machine learning system, respective locality sensitive hash vectors computed based on respective gradient vectors of a training objective function;
finding, by the server, a subset of the respective clients, by solving an optimization problem to minimize gradient divergence for the subset of the respective clients, wherein the respective locality sensitive hash vectors are used in solving the optimization problem;
selecting, by the server, the subset of the respective clients for further participating in the federated machine learning; and
wherein using the respective locality sensitive hash vectors in the federated machine learning speeds up transmitting and processing model parameters.

9. The computer-implemented method of claim 8, further comprising:
determining, by the server, whether a new round of client selection is needed;
in response to determining that the new round of client selection is needed, requesting, by the server, the respective clients to send respective new locality sensitive hash vectors computed based on respective current gradient vectors of the training objective function;
finding, by the server, a new subset of the respective clients, by solving the optimization problem to minimize gradient divergence for the new subset of the respective clients, wherein the respective new locality sensitive hash vectors are used in solving the optimization problem; and
selecting, by the server, the new subset of the respective clients for further participating in the federated machine learning.

10. The computer-implemented method of claim 9, further comprising:
in response to determining that the new round of client selection is not needed, keeping, by the server, the subset of the respective clients for further participating in the federated machine learning.

11. The computer-implemented method of claim 9, wherein the server initiates the new round of client selection, in response to at least one of conditions: a large number of selected clients in the subset of the respective clients become unavailable, cost of the subset of the respective clients has changed significantly, the model parameters are updated towards a direction or at a magnitude that is significantly different from a previous training cycle, and a predetermined amount of time or a predetermined number of iterations has passed.

12. The computer-implemented method of claim 8, further comprising:
sending to the respective clients, by the server, the model parameters;
computing, by the respective clients, the respective gradient vectors, using respective local datasets and the model parameters;
computing, by the respective clients, the respective locality sensitive hash vectors; and
sending to the server, by the respective clients, the respective locality sensitive hash vectors.

13. The computer-implemented method of claim 12, further comprises:
for computing the respective locality sensitive hash vectors, projecting, by the respective clients, the respective gradient vectors into a low dimensional space.

14. The computer-implemented method of claim 13, wherein the respective clients start with sending the respective locality sensitive hash vectors with lower dimensions; wherein, in response to determining that higher precision of the respective locality sensitive hash vectors is needed, the server requests the respective clients to send the respective locality sensitive hash vectors with higher dimensions, until the server is satisfied with received information included in the respective locality sensitive hash vectors.

15. A computer-implemented method of using locality sensitive hashing for efficiently updating a model in federated machine learning, the method comprising:
receiving, by a server in a federated machine learning system, from respective selected clients in the federated machine learning system, respective locality sensitive hash vectors computed based on respective parameter vectors of respective updated models;
determining, by the server, whether the respective updated models of the respective selected clients are sufficiently different from a model that is sent from the server to the respective selected clients for training, based on distances between a locality sensitive hash vector of the model and the respective locality sensitive hash vectors;
in response to determining that the respective updated models are sufficiently different from the model, requesting, by the server, the respective selected clients to send the respective parameter vectors to the server; and
wherein using the respective locality sensitive hash vectors in the federated machine learning speeds up transmitting and processing model parameters.

16. The computer-implemented method of claim 15, further comprising:
in response to determining that the respective updated models are not sufficiently different from the model, requesting, by the server, the respective selected clients to continue to train the model and to send to the server the respective locality sensitive hash vectors.

17. The computer-implemented method of claim 15, further comprising:
computing, by the respective selected clients, the respective locality sensitive hash vectors; and
sending to the server, by the respective selected clients, the respective locality sensitive hash vectors.

18. The computer-implemented method of claim 17, further comprising:

for computing the respective locality sensitive hash vectors, projecting, by the respective selected clients, the respective parameter vectors of the respective updated models into a low dimensional space.

19. The computer-implemented method of claim 15, for determining the respective selected clients, further comprising:
- receiving, by the server, from respective clients in the federated machine learning system, the respective locality sensitive hash vectors;
- grouping, by the server, the respective clients into respective clusters, based on the respective locality sensitive hash vectors; and
- determining, by the server, the respective selected clients for participating in the federated machine learning, by choosing at least one client from each of the respective clusters.

20. The computer-implemented method of claim 15, for determining the respective selected clients, further comprising:
- receiving, by the server, from respective clients in the federated machine learning system, the respective locality sensitive hash vectors;
- finding, by the server, a subset of the respective clients, by solving an optimization problem to minimize gradient divergence for the subset of the respective clients; and
- determining, by the server, the subset of the respective clients as the respective selected clients for participating in the federated machine learning.

* * * * *